United States Patent [19]

Ezis

[11] 4,264,550

[45] Apr. 28, 1981

[54] METHOD OF MAKING SILICON NITRIDE BASE CUTTING TOOLS -II

[75] Inventor: Andre Ezis, Gross Ile, Mich.

[73] Assignee: Ford Motor Company, Dearborn, Mich.

[21] Appl. No.: 105,828

[22] Filed: Dec. 20, 1979

[51] Int. Cl.$^3$ ............................................. C04B 35/58
[52] U.S. Cl. ........................................ 264/85; 51/307; 51/309; 264/332
[58] Field of Search ..................... 106/73.5, 65; 51/307, 51/309; 264/65, 66, 332, 85

[56] References Cited

U.S. PATENT DOCUMENTS

| | | | |
|---|---|---|---|
| 3,830,652 | 8/1974 | Gazza | 106/73.5 |
| 3,837,871 | 9/1974 | Weaver | 106/65 |
| 3,950,464 | 4/1976 | Masaki | 106/73.5 |
| 3,969,125 | 7/1976 | Komeya et al. | 106/73.5 |
| 4,071,371 | 1/1978 | Milberg et al. | 106/65 |
| 4,102,698 | 7/1978 | Lange et al. | 106/73.5 |
| 4,143,107 | 3/1979 | Ishii | 106/73.5 |

*Primary Examiner*—John Parrish
*Attorney, Agent, or Firm*—Joseph W. Malleck; Olin B. Johnson

[57] ABSTRACT

A method of making a unitary silicon nitride comprising object is disclosed. A uniform powder mixture is prepared of $Si_3N_4$ containing $SiO_2$ as an oxide surface coating, 4–12% by weight $Y_2O_3$, and 0.50–2.5% $Al_2O_3$. The mixture is heated to 1000°–1400° C. under a pressure of at least 2,000 psi for a time of at least one minute but sufficient to permit a nucleating reaction to take place in secondary phases. Heating is then increased to a temperature of 1680°–1750° C. under a pressure and for a period of time sufficient to produce 99.0% or more of full theoretical density in the pressed object.

13 Claims, No Drawings

METHOD OF MAKING SILICON NITRIDE BASE CUTTING TOOLS -II

BACKGROUND OF THE INVENTION

Silicpn nitride based materials, which have been hot pressed or sintered to a ceramic, have been recognized for their heat resistant qualities useful in structural members and in some cases for use as a cutting tool. However, silicon nitride, as a single substance, is not easily sintered, even under pressure, without the addition of sintering aids. Sintering aids are substances that form secondary compounds with silicon nitride or with silicon oxide present on the surface of the silicon nitride granules, which compounds form an intergranular binder assisting in the achievement of full density and greater strength properties under ambient conditions.

With known processing techniques, it has been recognized that the substances formed by such sintering aids are harmful to high temperature use of the base ceramic since the compounds are amorphous or glassy in nature.

One attempt by the prior art (See U.S. Pat. No. 4,046,580) to eliminate the glassy phase has consisted of stripping or eliminating the silicon oxide coating on the silicon nitride granules thereby forcing any chemical reaction with the pressing aid to be with the silicon nitride. The resulting secondary phase of this attempt tends to be less glassy, but unfortunately makes the process expensive and the phase is less useful to cutting tool applications. More useful phases would be silicon oxynitrides such as $Y_{10} Si_7 O_{23} N_4$, or $Y_1 Si_1 O_2 N_1$. These useful secondary phases, which are formed as a result of a chemical reaction between elements of the ternary system $Si_3N_4.Y_2O_3.SiO_2$, are of more significance since they make processing more economical and promote enhanced strength and thermal shock properties for a ceramic material that is to be used for cutting of cast iron.

SUMMARY OF THE INVENTION

The invention relates to a method of making a unitary silicon nitride comprising object and to a method of making a silicon nitride comprising cutting tool. The method of making the object comprising $Si_3N_4$ includes the step of : (a) uniformly mixing silicon nitride powder containing $SiO_2$ as an oxide surface coating and 4–12% by weight $Y_2O_3$ powder, and 0.50–2.5% $Al_2O_3$, (b) heating the mixture to 1000°–1400° C. under a pressure of at least 2000 psi and for a time of at least one minute but sufficient to permit a nucleating reaction to take place in secondary phases formed as a result of heating, and (c) continuing to heat the mixture to a temperature of 1680°–1750° C. under a pressure and for a period of time sufficient to produce at least 99%, preferably 99.5% or more of full theoretical density in said pressed mixture. The resulting pressed body will contain fully crystallized secondary phases of $Si_3N_4.SiO_2.Y_2O_3$. The pressed body when cooled, can be shaped as cutting tool useful particularly in the machine cutting of cast iron.

It is advantageous in carrying out the method that in step (b) the pressure be 2,000–5,000 psi and the time period 5–15 minutes, and in step (c) the pressure be 3,500–5,000 psi and the time period 5–45 minutes. It is preferred that steps (b) and (c) be carried out under a flowing $N_2$ atmosphere and that the $SiO_2$ be limited to 0.5–3.5% of the mixture, and that the starting powder for $Si_3N_4$ be at least 85% alpha phase. It is also advantageous if a precompaction step, at light pressures of about 500 psi is used between steps (a) and (b)

DETAILED DESCRIPTION OF THE INVENTION

An illustrative method mode for carrying out the inventive method of making silicon nitride based cutting tools for metals is as follows:

(1) A uniform powder mixture is prepared comprising essentially alpha phase silicon nitride powder (preferably at least 85% alpha phase) carrying 0.5–1.5% silicon oxide on the surface of the silicon nitride particles and a sintering aid consistng of 4–12% $Y_2O_3$. 0.75–2.5% alumina is added by ball milling attrition.

The content of $SiO_2$ on the silicon nitride powder may be indirectly determined by atomic activation analysis. The major impurities in the silicon nitride powder are preferably controlled in the following manner: less than 0.5% iron, less than 0.01% calcium, less than 0.4% aluminum, and less than 2.0% $O_2$. It is advantageous if the cation impurities are limited to 0.5% or less, excluding free silicon and $O_2$.

The average particle size for the silicon nitride powder is preferably controlled or selected to be 2.0–2.5 microns. The particle size is preferably determined by the x-ray sedimentation method. With respect to the yttria powder, such powder is preferably controlled to have a chemistry of 99.9% pure, and its particle size is preferably controlled to about −325 mesh.

It is preferred that the mixture be milled in a ball milling device so that the final average particle size of the mixture will be in the range of 1.0–1.7 microns. To this end, the powder ingredients are placed in a milling device along with the introduction of $Al_2O_3$ milling media. The alumina serves as a catalyzer for a nucleating reaction to be described. It is typical to employ a wetting lubricant such as methanol which may be added in the ratio of 1:1 with the silicon nitride powder. The powder mixture is sufficiently ground and milled for a predetermined time, which depends on mill speed, particle size of the starting powders, and the average particle size to be achieved. The mixture is then preferably dried and subjected to a screening operation preferably using a 100 mesh screen. The milled mixture should contain 0.50–2.5% of the alumina milling media. (2) The mixture is then heated to 1000°–1400° C. under a pressure of at least 2000 psi and for a period of time sufficient to permit a nucleating reaction to take place in secondary phases formed as a result of heating. During heat up of the powder mixture, mechanical pressure is applied initially at room temperature and maintained throughout heat up so that when the powder mixture passes through the temperature zone of 1000°–1400° C., the powder mixture is under a pressure of 2000–5000 psi (advantageously about 4,500 psi) when $AlO_3$ is employed. Preferably, in carrying this out, the mixture is placed in a graphite die assembly for applying pressure. The assembly is air blown to a clean condition and coated with a boron nitride slurry and dried to a coating thickness of about 0.002 inches prior to the insertion of the powder mixture. It is preferred that the powder mixture after having been inserted into the coated graphite dies, be precompacted under a pressure of about 500 psi prior to the introduction of any heat and prior to elevation to pressing pressures in excess of 2000 psi. When the pressure dial indicator stabilizes at 500 psi, the mechanical loading is advantageously increased to 4,500 psi at approximately the rate of 1000 psi per minute. When this latter pressure condition is reached, heat is administered by induction heating which heats up a graphite die chamber in the assembly at a rate which is preferably no less than 100° C./minute. The time period or excursion in the temperature zone of 1000°–1400° C. can be as little as one minute and as long as desired but advantageously is 5–15 minutes. Pressure and time are interrelated variables that together are adjusted under given conditions to achieve a nucleating reaction in the compounds or secondary phases formed between $Si_3N_4$, $SiO_2$ and $Y_2O_3$. The higher the bulk density of the powder the lower the applied pressure can be within a given range. The pressure of $Al_2O_3$ promotes or catalyzes the formation of nucleii as part of this reaction and thus influence time. The nucleating reaction is necessary to the insitu crystallization of the secondary phases.

As indicated, it has been found that the addition of 0.75–2.5% $Al_2O_3$ catalyzes the nucleating reaction. $Al_2O_3$ is advantageously added by adapting the milling media to consist of alumina, except for up to 10% $SiO_2$ Thus, during the ball milling operation, there is a transfer during each particle impact with the milling media of a tiny portion of alumina. These particle transfers build up over a predetermined period of time so that the powder mixture will uniformly contain a desired alumina content. The milling media time to achieve this specific transfer of alumina, so that it does not exceed 2.5% is determined by experimental experience. Such experience has shown that there will be a corresponding milling media wear in the range of 0.75–2.5% weight percent.

(3) After the nucleating reaction has taken place, heat up of the mixture is continued to the temperature of 1680°–1750° C. under a pressure and for a period of time sufficient to produce 99%, preferably 99.5% or more of full theoretical density in the pressed mixture. This step achieves hot press sintering. It is preferred that the applied pressure be 3,500–5,000 psi for at least 5 minutes and for as long as economically justifiable, but advantageously 15–45 minutes.

The product resulting from the above method can be cooled at any rate, even quenched, to form a silicon nitride compirsing object which has a primary matrix phase of silicon nitride and crystallized secondary phases in the grain boundary of the matrix.

With the prescribed powder chemistry and hot pressing technique, the resulting product will possess a density in the range of 3.28–3.35 grams/cm³, a hardness on the 45-N scale in the range of 86.5–90.0. The secondary phase constituent will consist of one or more of three crystallized forms in the final product. Such forms of secondary phase comprise the group consisting of $5Y_2O_3.4SiO_2.Si_3N_4$; $2Y_2O_3.SiO_2.Si_3N_4$; and $Y_2O_3.SiO_2$. Two of these secondary phases are silicon oxynitrides and the other is a silicon oxide. The molecular formulas for each of the two oxynitrides are $Y_{10}Si_7O_2N_4$ and $Y_1Si_1O_2N_1$. These oxynitrides will, in most cases, occupy approximately 80% of the secondary phase present in the resulting product and the silicon oxide will, in most cases, occupy the remaining 20% of the product secondary phase. The silicon nitride in the final product will be of the beta type, the conversion from alpha to beta occurring typically before full density is achieved. In the case where aluminum oxide is used as an intended additive in the range of up to 2.5%, the final product will have 100% beta silicon nitride containing aluminum atoms.

The resulting product is shaped as a cutting tool preferably by diamond sawing. Tool life of this product has been found to be related to the existence of the crystalline secondary phases. For example, wet milled silicon nitride powder containing 7.22 weight percent $Y_2O_3$ and 2.5% $Al_2O_3$ was hot pressed at 1700° C. with 5000 psi load applied when the mixture reached 1700° C. The hot pressing was carried out for 2 hours. The resultant material, when shaped and used as a cutting tool in a continuous machining operation of grey cast iron showed unacceptable tool life. The same composition hot pressed at identical conditions with the exception that the load (5000 psi) was applied at room temperature and continuously thereafter, produced a product that showed acceptable tool life. X-ray analysis showed the presence of crystallized yttrium silicon oxynitride compounds in the latter example and showed the absence of these compounds in the former example.

I claim:

1. A method of making a unitary silicon nitride comprising object by the steps comprising:
   (a) uniformly mixing silicon nitride powder containing $SiO_2$ as an oxide surface coating, 4–12% by weight $Y_2O_3$ powder, and 0.05–2.5% $Al_2O_3$;
   (b) heating the mixture to 1000°–1400° C. under a pressure of at least 2000 psi and for a time of at least one minute but sufficient to permit a nucleating reaction to take place in secondary phases formed as a result of heating; and
   (c) continuing to heat the mixture to a temperature of 1680°–1750° C. under a pressure and for a period of time sufficient to produce 99% or more of full theoretical density in said pressed mixture.

2. The method as in claim 1 in which said step (b) is carried out for 5–15 minutes under a pressure of 2000–5000 psi.

3. The method as in claim 1 in which said step (c) is carried out with a pressure of 3500–5000 psi for at least 5 minutes.

4. A method of making a silicon nitride based metal cutting tool comprising:
   (a) preparing a uniform mixture of silicon nitride powder containing $SiO_2$ as an oxide surface coating, 4–12% by weight of $Y_2O_3$ powder and 0.50–2.5% $Al_2O_3$.
   (b) heating said mixture to a temperature of 1000°–1400° C. while under a pressure of at least 2000 psi for a time of at least one minute but sufficiently longer to permit a nucleating reaction to take place in secondary compounds formed between said $Si_3N_4$, $Y_2O_3$ and $SiO_2$ as a result of heating;
   (c) increase the temperature to which said mixture is exposed to 1680°–1750° C. while under a pressure and for a period of time sufficient to produce 99.5% or more of full theoretical density in said pressed mixture;
   (d) shaping said pressed body as a cutting tool; and
   (e) cooling said pressed mixture to form a silicon nitride based body having crystallized secondary compounds.

5. The method as in claim 4 in which step (b) is carried out for five to fifteen minutes under a pressure of 2000–5000 psi.

6. The method as in claim 4 in which said step (c) is carried out with a pressure of 3500–5000 psi for at least 5 minutes.

7. The method as in claim 4 in which step (c) is carried out with a pressure of 3500–5000 psi for 15–45 minutes.

8. The method as in claim 4 in which said mixture is precompacted under a light pressure of about 500 psi between steps (a) and (b).

9. The method as in claim 4 in which said silicon nitride powder contains 0.5–3.5% $SiO_2$.

10. The method as in claim 4, in which the silicon nitride powder, prior to heating, is constituted of at least 85% alpha phase.

11. The method as in claim 4, in which said steps (b) and (c) is carried out under a flowing nitrogen atmosphere.

12. A method of making a unitary silicon nitride comprising object having crystallized components by the steps comprising:
   (a) uniformly mix silicon nitride powder containing $SiO_2$ as an oxide surface coating, 4–12% by weight $Y_2O_3$ powder and at least 0.5% of a nucleating catalyzer ingredient;
   (b) heat the mixture to 1000°–4000° C. under a pressure and for a period of time to permit a nucleating reaction to take place in secondary compounds formed between $Si_3N_4$, $SiO_2$ and $Y_2O_3$ as a result of heating;
   (c) continue to heat the mixture by increasing the temperature to 1680°–1750° C. under a pressure and for a period of time sufficient to produce 99.5% or more of full theoretical density in said pressed mixture.

13. The method as in claim 12 in which said nucleating catalyzer is selected from the group consisting of WC, W, $Al_2O_3$ and $SiO_2$.

* * * * *